(12) United States Patent
Zheng et al.

(10) Patent No.: US 11,087,089 B2
(45) Date of Patent: Aug. 10, 2021

(54) ASPECT-DRIVEN MULTI-DOCUMENT SUMMARIZATION

(71) Applicant: SAP SE, Walldorf (DE)

(72) Inventors: Xin Zheng, Singapore (SG); Karthik Muthuswamy, Heidelberg (DE); Aixin Sun, Singapore (SG)

(73) Assignee: SAP SE, Walldorf (DE)

( * ) Notice: Subject to any disclaimer, the term of this patent is extended or adjusted under 35 U.S.C. 154(b) by 158 days.

(21) Appl. No.: 16/152,553

(22) Filed: Oct. 5, 2018

(65) Prior Publication Data

US 2020/0110801 A1   Apr. 9, 2020

(51) Int. Cl.
| | |
|---|---|
| *G06F 17/00* | (2019.01) |
| *G06F 40/30* | (2020.01) |
| *G06N 3/04* | (2006.01) |
| *G06F 16/93* | (2019.01) |
| *G06F 40/166* | (2020.01) |
| *G06F 40/169* | (2020.01) |
| *G06F 40/14* | (2020.01) |
| *G06F 40/137* | (2020.01) |

(52) U.S. Cl.
CPC ............. *G06F 40/30* (2020.01); *G06F 16/93* (2019.01); *G06F 40/166* (2020.01); *G06F 40/169* (2020.01); *G06N 3/0445* (2013.01); *G06F 40/137* (2020.01); *G06F 40/14* (2020.01)

(58) Field of Classification Search
CPC ...... G06N 3/08; G06N 3/0445; G06N 3/0454; G06N 3/084; G06F 40/30; G06F 40/20; G06F 16/35; G06F 40/166; G06F 40/169; G06F 16/93; G06F 40/14; G06F 40/137; G06F 16/345

See application file for complete search history.

(56) References Cited

U.S. PATENT DOCUMENTS

| | | | |
|---|---|---|---|
| 8,452,818 B2 | 5/2013 | Feng et al. | |
| 9,218,414 B2 | 12/2015 | Soubbotin | |
| 9,881,082 B2 | 1/2018 | Krishnamurthy et al. | |
| 2004/0117725 A1* | 6/2004 | Chen | G06F 16/345 715/254 |

(Continued)

FOREIGN PATENT DOCUMENTS

WO   WO 2017130089   * 12/2018

*Primary Examiner* — Andrew T McIntosh
(74) *Attorney, Agent, or Firm* — Fish & Richardson P.C.

(57) ABSTRACT

Methods, systems, and computer-readable storage media for generating document representations of documents in a set of documents based on sentence embeddings that are provided using a recurrent neural network (RNN) encoder, each document including an electronic document, generating aspect representations based on sentences included in documents of the set of documents, and comment documents in a set of comment documents, determining a first topic representation based on the document representations, determining a second topic representation based on aspect saliences with respect to the first topic representation, calculating salience scores, each salience score associated with a respective sentence, and calculated based on a set of initial salience scores, and a respective aspect salience score, and generating a summary of the set of documents based on the salience scores, the summary including one or more sentences included in documents of the set of documents.

20 Claims, 4 Drawing Sheets

(56) References Cited

U.S. PATENT DOCUMENTS

| | | | |
|---|---|---|---|
| 2005/0125216 A1* | 6/2005 | Chitrapura | G06F 40/30 |
| | | | 704/1 |
| 2008/0270380 A1 | 10/2008 | Ohm et al. | |
| 2009/0300486 A1 | 12/2009 | Zhu et al. | |
| 2014/0047310 A1 | 2/2014 | Potiagalov | |
| 2017/0213130 A1* | 7/2017 | Khatri | G06F 16/345 |
| 2018/0096057 A1 | 4/2018 | Zheng et al. | |
| 2019/0034416 A1* | 1/2019 | Al Hasan | G06N 3/0445 |

\* cited by examiner

ASPECT-DRIVEN MULTI-DOCUMENT SUMMARIZATION

BACKGROUND

Information retrieval systems can be used to identify electronic documents (e.g., books, papers, web pages, in electronic form) that may be relevant to users. For example, a user can submit a query to an information retrieval system, and electronic documents determined to be relevant to the query can be provided to the user. Other systems can also convey documents to users. For example, multiple documents can be conveyed to users in a forum, and/or as reports for events (e.g., burst events).

In some systems, electronic documents can be summarized. In this manner, a summary (e.g., abstract) of an electronic document can be provided to a user, for example, such that the user can determine whether the electronic document is of interest. Such systems can identify, and/or summarize electronic documents based on words present in the document. In some systems, multiple documents are to be summarized, the summary conveying information about the multiple documents as a whole.

Multi-document summarization is a challenging, resource-intensive task. For example, documents in the set of documents contain diverse, redundant, and noisy information. Within each single document, the sequential context information needs to be considered. Further, among documents, their relationships should also be taken into consideration to provide quality summaries.

SUMMARY

Implementations of the present disclosure are directed to multi-document summarization. More particularly, implementations of the present disclosure are directed to aspect-driven, multi-document summarization.

In some implementations, actions include generating document representations of documents in a set of documents based on sentence embeddings that are provided using a recurrent neural network (RNN) encoder, each document including an electronic document, generating aspect representations based on sentences included in documents of the set of documents, and comment documents in a set of comment documents, determining a first topic representation based on the document representations, determining a second topic representation based on aspect saliences with respect to the first topic representation, calculating salience scores, each salience score associated with a respective sentence, and calculated based on a set of initial salience scores, and a respective aspect salience score, and generating a summary of the set of documents based on the salience scores, the summary including one or more sentences included in documents of the set of documents. Other implementations of this aspect include corresponding systems, apparatus, and computer programs, configured to perform the actions of the methods, encoded on computer storage devices.

These and other implementations can each optionally include one or more of the following features: generating document representations of documents includes sequentially feeding sentence embedding into a next level bidirectional RNN encoder; determining the first topic representation includes using the bidirectional RNN to encode document embeddings to the first topic representation; the first topic representation is a concatenation of hidden vectors on both directions at the last step of the RNN; the aspect saliences are calculated using an attention mechanism on each aspect representation with respect to the first topic representation; weighted aspect embeddings are fed into the bidirectional RNN, and the second topic representation is provided as a concatenation of hidden vectors on both directions at the last step of the RNN; and each salience score is determined for a respective sentence and aspect by identifying a maximum salience score in the set of initial salience scores, and multiplying the maximum salience score by an aspect salience of the respective aspect.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DESCRIPTION

Implementations of the present disclosure are directed to multi-document summarization. More particularly, implementations of the present disclosure are directed to aspect-driven, multi-document summarization. Implementations can include actions of generating document representations of documents in a set of documents based on sentence embeddings that are provided using a recurrent neural network (RNN) encoder, each document including an electronic document, generating aspect representations based on sentences included in documents of the set of documents, and comment documents in a set of comment documents, determining a first topic representation based on the document representations, determining a second topic representation based on aspect saliences with respect to the first topic representation, calculating salience scores, each salience score associated with a respective sentence, and calculated based on a set of initial salience scores, and a respective aspect salience score, and generating a summary of the set of documents based on the salience scores, the summary including one or more sentences included in documents of the set of documents In general, and as described in further detail herein, implementations of the present disclosure provide an extractive multi-document summarization solution, which considers both sequential context information in single document and the relationships among documents in the given set. Secondary data (e.g., readers' comments) are incorporated for estimating saliences of aspects, which helps identify attractive information for general readers. Experimental results show that implementations of the present disclosure outperform state-of-the-art baselines.

Figure 1:
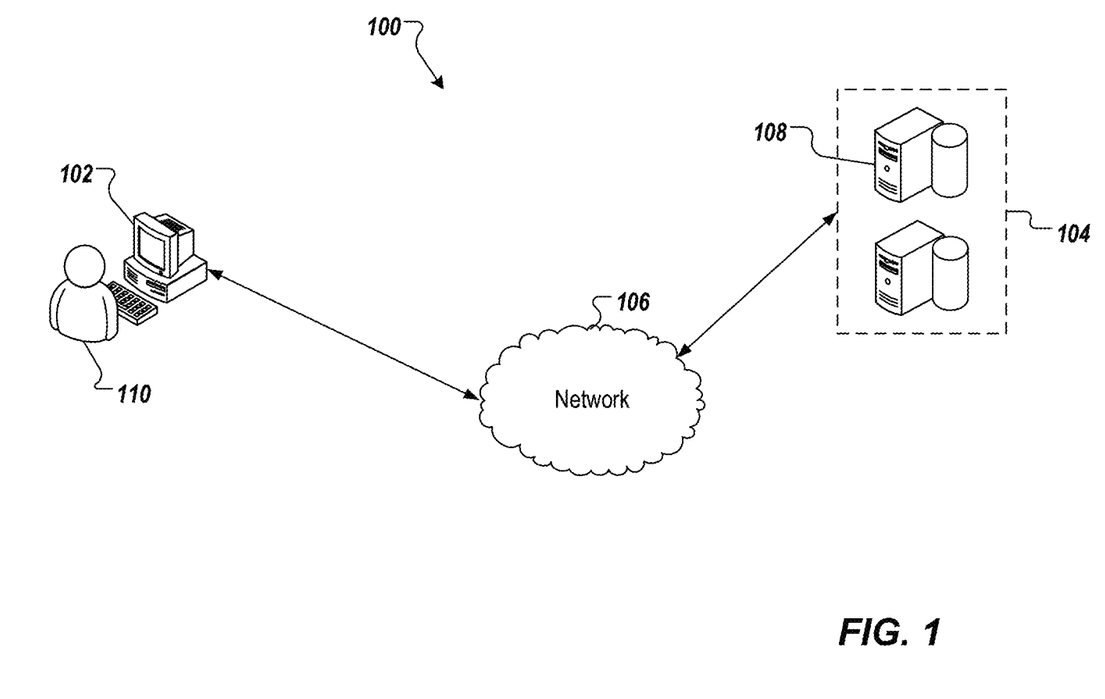
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104, and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can host a multi-document summarization service (e.g., provided as one or more computer-executable programs executed by one or more computing devices). For example, input data (text data, secondary data) can be provided to the server system (e.g., from the client device 102), and the server system can process the input data through the multi-document summarization service to provide result data. For example, the server system 104 can send the result data to the client device 102 over the network 106 for display to the user 110.

As introduced above, implementations of the present disclosure are directed to document summarization, multi-document summarization, in particular. To provide context for implementations of the present disclosure, summarization of documents, such as electronic documents, includes computer-implemented analysis of a document to provide a summary of the content thereof. Multi-document summarization is useful and helpful in many applications. Example applications can include, without limitation, information retrieval systems, answer summarization in a forum, and summarization of reports for events (e.g., burst events). In some examples, a given set of documents is assumed to share the same underlying topic. To produce a good quality summary, both the content of the single documents, and relationships among documents should be taken into consideration. The summary, which may be limited in length, is expected to cover the important points conveyed by the set of documents, as a whole. However, the set of documents is often featured with information diversity, redundancy, and of piecemeal content. These properties make multi-document summarization an extremely challenging, resource-intensive task.

To summarize multiple documents with a limited number of words, only the most important or most representative points should be included in summary. Various models have been proposed for this task. For example, graph-based models use random walk on sentence graphs to select the most representative sentences in the graph as the summary. However, when the sentence graph is not well connected (e.g., forming different communities), the graph-based methods can be less effective. To deal with this situation, it has been proposed that a document set describes several themes of the underlying topic, where not all of the themes are equally important. Accordingly, in these approaches, sentences are grouped into clusters, and a random walk is separately performed on each cluster. This approach, however, is solely based on statistical information. The sequential context information within each document is not considered.

In view of the foregoing, and as described in further detail herein, implementations of the present disclosure provide a model that deals with sequential context knowledge in single document, and the semantic relationships among documents in a set of documents having the same underlying topic. In some implementations, the salience of each sentence in a document is not individually evaluated. Instead, the surrounding sentences (e.g., context information) affect a sentence's importance.

In further detail, implementations of the present disclosure incorporate sequential context information for estimating sentence salience. The relationships among documents are complicated, and cannot be assumed as being of one type. For example, some sentences could be similar, while others could be complementary, or evolutionary. Implementations of the present disclosure consider sentences in documents should be related to different aspects of the underlying topic. Thus, despite the diverse relationships, sentences are assigned to different aspects. Further, and as described in further detail herein, instead of hard clustering of aspects, implementations of the present disclosure provide soft clustering. To get a better understanding of what aspects are more attractive to users (e.g., readers of the documents), implementations of the present disclosure combine secondary data (e.g., readers' comments) when estimating aspects.

The focuses mentioned by many readers could also be interested points to other readers.

As described in further detail herein, implementations of the present disclosure provide a hierarchical, bidirectional recurrent neural network (RNN) to produce sentence, and document representations. More particularly, the RNN encodes sequential context information at each position. To distribute sentences into different aspects, it is assumed that there are k latent aspects. Aspect representations are constructed from both document data (e.g., sentences), and secondary data (e.g., readers' comments). To estimate saliences of aspects, an attention mechanism is applied to calculate the relative importance for each aspect with respect to the underlying topic. In some examples, the representation of a topic is constructed from document embeddings. The attention mechanism is employed on context-enriched sentence embeddings, and aspect representations. By multiplying saliences of aspects and sentences, an overall ranking is obtained. Top ranked sentences are extracted, and are used to provide the summary, which can be limited in length.

In further detail, multi-document summarization can be defined as follows: given a set of documents under the same topic, $D=\{d_1, d_2, \ldots, d_n\}$, a pool of sentences from these documents, denoted by S is provided, as well as a set of comments $C_i=\{c_{i,1}, c_{i,2}, \ldots, c_{i,h}\}$ about each document $d_i$. Both document $d_i$ and comment $c_{i,j}$ consists of a sequence of sentences, $d_i=\{s_1, s_2, \ldots, s_{|d_i|}\}$ and $c_{i,j}=\{r_1, r_2, \ldots, r_{|c_{i,j}|}\}$. In accordance with implementations of the present disclosure, document sentences are extracted from S to summarize the set of documents. In some examples, this also addresses readers' focuses contained in comments.

To make better use of comments, implementations of the present disclosure leverage relationships between news documents and their comments based on a provided dataset. From the dataset, it can be observed that the number of comments are not uniformly distributed over news documents of the same topic. For example, some news documents are associated with a large number of comments, while some have no comments at all. Because the documents share the same topic, comments about one document may also be related to other documents in one set. Meanwhile, it is also common for users to make comments after getting through several topic-relevant articles. Thus, comments for one document could also contain information from related documents.

To verify this assumption, a vocabulary overlap between news and comments can be calculated. In some examples, a ratio of overlapping vocabulary of each news and its comments, over news vocabulary is calculated. For an example dataset, the average number is 0.345. Against each news and comments pair, the same ratio of all the news and comments under the same topic over news vocabulary is calculated. For the example dataset, the average number is 0.447. Therefore, by considering comments as related to the whole document set seems to be more reasonable than document and comment set pair. In view of this, inputs to the model of the present disclosure can be denoted by a set of news documents $D=\{d_1, d_2, \ldots, d_n\}$ with their sentences S, and a set of comments $C=\{c_1, c_2, \ldots, c_m\}$ with a pool of comment sentences R. Following, boldface type is used for each notation to represent their embeddings.

In some implementations, and as introduced above, the model of the present disclosure considers contextual information along sequence of sentences in single document, and the relationships among documents under the same topic. To tackle sentences semantic correlations in single document, a hierarchical RNN is implemented, which can inherently capture the sequential context information. From a global view of the set of documents, it is natural to conclude that they describe several aspects or sub-topics of the underlying topic. By distributing sentences into appropriate aspects, complex relationships among documents can be more efficiently accounted for.

To capture readers' interests about the topic, the model of the present disclosure incorporates readers' comments to discover attractive aspects of the underlying topic. However, it is common to find that not all the aspects about a topic are equally important. Accordingly, implementations of the present disclosure include an attention mechanism to estimate relative importance of aspects. In some examples, for each aspect, relative saliences of each sentence with respect to aspects are determined. The model of the present disclosure constructs summaries based on the sentences-aspects-topic hierarchical structure. By multiplying aspect salience scores with sentence relative salience scores, an overall sentences ranking is determined. Top ranked sentences are selected as the multi-document summary.

With regard to document representation, implementations of the present disclosure start representation generation from words, and pre-train word embeddings $W \in \mathbb{R}^{|V| \times u}$ using a word embedding technique on both documents and comments. An example technique includes, without limitation, word2vec. The representations for sentences and documents are learned in hierarchical structure.

Figure 2:
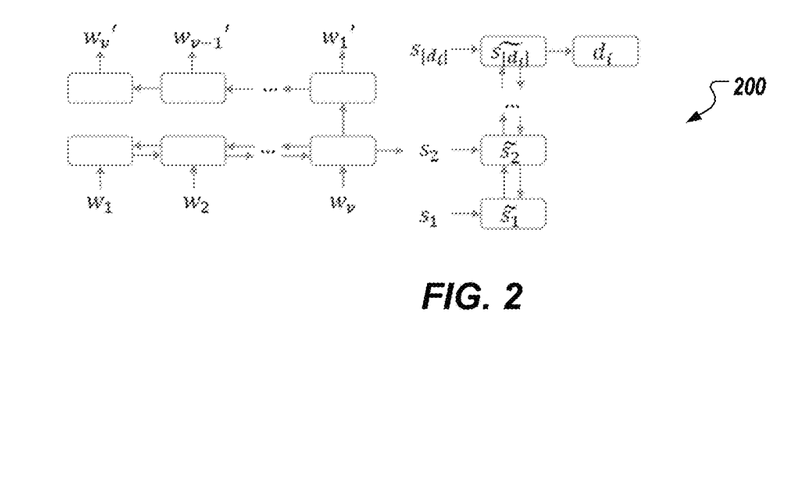
FIG. 2 depicts an example hierarchical structure for sentence and document representations in accordance with implementations of the present disclosure.

FIG. 2 depicts an example hierarchical structure 200 for sentence and document representations in accordance with implementations of the present disclosure. The embeddings of words $w_i$ in each sentence is fed into a simple bidirectional RNN encoder-decoder model in order. In some example, a gated recurrent unit (GRU) is adopted as the basic RNN unit. Each sentence acts as both encoder input and decoder target. Thus, the encoder-decoder can be considered as a RNN auto-encoder. Here, the sentence representation $S \in \mathbb{R}^{|S| \times u}$ is learned without losing word sequence information. The concatenated hidden vectors on both directions at the last step of encoder is adopted as sentence embedding, $s=[\overleftarrow{\mathbf{h}}_{|s|}^T ; \overrightarrow{\mathbf{h}}_{|s|}^T]^T$. The loss function for the RNN encoder-decoder is provided as:

$$\mathcal{L}_e = -\Sigma_{X \in S \cup R} \log p(X|X;\theta) \quad (1)$$

It can be noted that sentence embeddings for both news s and comments r are provided from the RNN encoder-decoder structure. Words in both documents and comments share the same word embedding W. The sentence embeddings for comments are $R \in \mathbb{R}^{|R| \times u}$ where $r=[\overleftarrow{\mathbf{h}}_{|r|}^T ; \overrightarrow{\mathbf{h}}_{|r|}^T]^T$.

In some implementations, the document sentence embeddings s are fed into the next level bidirectional RNN encoder sequentially to generate document representation $D \in \mathbb{R}^{|D| \times u}$. Note that, no decoding process exists from sentence to document. At each encoding step for document embedding, the hidden vectors are provided on both directions for each sentence, which contain rich sequential context information. These are concatenated as a context-enriched sentence embedding $\tilde{S} \in \mathbb{R}^{|S| \times u}$, where $\tilde{s}=[\overleftarrow{\mathbf{h}}_{s_i}^T ; \overrightarrow{\mathbf{h}}_{s_i}^T]^T$. The concatenated hidden vectors on both directions are provided as the document embedding $d=[[\overleftarrow{\mathbf{h}}_{|d|}^T ; \overrightarrow{\mathbf{h}}_{|d|}^T]^T$. Accordingly, the sequential context information among sentences in single document are inherently solved by the hierarchical RNN.

With regard to aspect representation, aspects are constructed for the underlying topic from sentences in both the documents and the comments. As described herein, document embeddings are provided using the bidirectional RNN, and account for contextual information. To be distinguished from the view of document, sentence representations generated from word embeddings are used to construct aspect representations. In other words, only single sentences without contextual information are considered for aspect formation.

Because the number of aspects contained in the document set and comments is unknown, the number of latent aspects can be set to k. That is, it is assumed that there could be k latent aspects to be learned automatically from documents, and comments. With both documents and comments representations $E=[S; R] \in \mathbb{R}^{(|S|+|R|) \times u}$, the aspect embeddings can be calculated as:

$$a = ReLU((He + b_h)U + b_u) \quad (2)$$

where $H \in \mathbb{R}^{k \times (|S|+|R|)}$, $U \in \mathbb{R}^{u \times u}$, $b_h \in \mathbb{R}^k$ and $b_u \in \mathbb{R}^k$ are trainable parameters. Thus, the aspect representation is $A \in \mathbb{R}^{k \times u}$.

In some examples, each of the aspect embeddings represents a unique sub-topic for the underlying topic, which means that the overlap across different aspects should be small. In some examples, the aspect embeddings are constrained to be orthogonal with each other. For example:

$$\mathcal{L}_r = \|AA^T - I_{k \times k}\| \quad (3)$$

Figure 3:
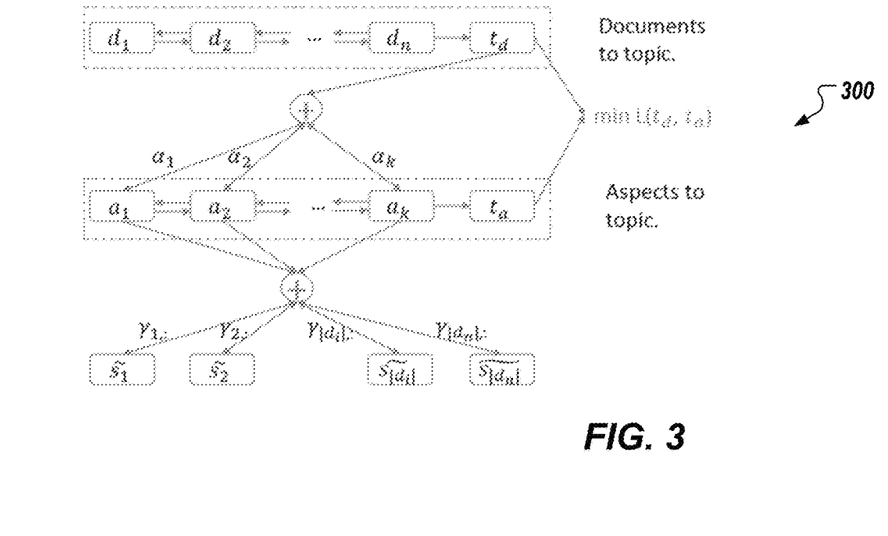
FIG. 3 depicts an example salience estimation for document sentences and aspects in accordance with implementations of the present disclosure.

FIG. 3 depicts an example salience estimation 300 for document sentences and aspects in accordance with implementations of the present disclosure. In some implementations, the underlying topic is viewed from multiple perspectives. In a first perspective, the set of documents is an explicit composition of topics. In a second perspective, the underlying topics are implicitly composed of latent aspects. Therefore, either from documents' view or from aspects' view, similar topic representations can be obtained.

With regard to the documents' view (from document to topic), a document representation d is provided from a hierarchical RNN. Again, a bidirectional RNN is used to encode document embeddings to topic representation $t_d$, which is the concatenation of hidden vectors on both directions at the last step. Here, the document sequences do not affect the final performance. With regard to the aspects' view (from aspect to topic), not all the aspects are equally important to the underlying topic. Some aspects are more salient than others. Implementations of the present disclosure leverage saliences of aspects to filter less important information, or noise, to generate a distilled topic representation $t_a$. This is different from the topic representation constructed from document $t_d$, which encodes all the information into a topic vector.

In some implementations, to calculate saliences of aspects, an attention mechanism is applied to each aspect representation $a_i$ with respect to the topic representation $t_d$, which is generated from documents. For example:

$$\alpha_i = \frac{\exp(e_i)}{\sum_{k=1}^{m} \exp(e_k)} \quad (4)$$

$$e_i = v^T \tanh(Ha_i + Ut_d)$$

where H, U and v are trainable parameters. Accordingly, weighted aspect embedding $\alpha_i a_i$ is fed to a bidirectional RNN as above. The concatenation of hidden vectors on both directions at the last step is the topic representation $t_a$ generated by aspects. Both topic representations $t_a$ and $t_d$ should be similar to each other, because they denote the same underlying topic. Because the two embeddings are from identical structures as a Siamese network, a contrastive loss can be adopted, which efficiently estimates saliences of aspects through backpropagation. For example:

$$\mathcal{L}_t = \beta * \tfrac{1}{2} * (\max\{0, 1 - t_d t_a\})^2 + (1-\beta) * \tfrac{1}{2} * (t_d - t_a)^2 \quad (5)$$

where $\beta$ is a hyper-parameter and we set it to 0.5.

It can be noted that both document sentences s, and comment sentences r are used to construct aspect representations a. Because comments are diverse and noisy, the comments should not dominate the aspects. Instead, comments are used to highlight readers' focuses that exist in the document set. Although salience scores of aspects are used to filter the information encoded in $t_a$, noises could still affect the quality of the learned aspects. Consequently, implementations of the present disclosure constrain on aspect representation learning.

In some implementations, the aspect representations are to reflect the set of documents. Accordingly, aspect vectors should be able to be solely constructed based on document sentence embeddings. In some examples, distilled aspect embeddings are constructed with weighted sentence embeddings. To distinguish from s, the context-enriched sentence embedding $\tilde{S} \in \mathbb{R}^{|S| \times u}$, described herein, is used.

In some implementations, salience score $\gamma$ is determined for sentences as in Equation 4, but with $\tilde{s}$ and a as input. For example:

$$\gamma_{i,j} = \frac{\exp(e_{i,j})}{\sum_{k=1}^{m} \exp(e_{i,k})} \quad (6)$$

$$e_{i,j} = v^T \tanh(H\tilde{s}_i + Ua_j)$$

The aspect representation is approximated in a similar manner as in Equation 2. For example:

$$a^{\tilde{s}ij} = ReLU(\gamma_{i,j}\tilde{s}_i H + b_h) \quad (7)$$

where $H \in \mathbb{R}^{u \times u}$ and $b_h$ are trainable parameters. Contrastive loss is adopted. For example:

$$\mathcal{L}_a = \beta * \tfrac{1}{2} * (\max\{0, 1 - aa^{\tilde{s}}\})^2 + (1-\beta) * \tfrac{1}{2} * (a - a^{\tilde{s}})^2 \quad (8)$$

where $\beta$ is a hyper-parameter (e.g., set to 0.5). With backpropagation, salience scores for sentences are learned. Thus, the overall training objective is:

$$\mathcal{L} = \mathcal{L}_s + \mathcal{L}_r + \mathcal{L}_t + \mathcal{L}_a \quad (9)$$

In some implementations, the maximum (max) salience score for each sentence over aspects $\max\gamma_i$, is multiplied with the corresponding aspect salience score $\alpha_j$, where $j = \text{argmax}\gamma_i$, to get the final salience score $\max\gamma_i\alpha_j$ for a sentence. The top ranked sentences are extracted for the summary. In some examples, the top ranked sentences are extracted up to a length limit (e.g., the total number of words should be less than 100). For example, if the $i^{th}$ ranked sentence would result in the total number of words being greater than the length sentence, then the top ranked sentence to the i-$1^{th}$ ranked sentence are selected for the summary.

Figure 4:
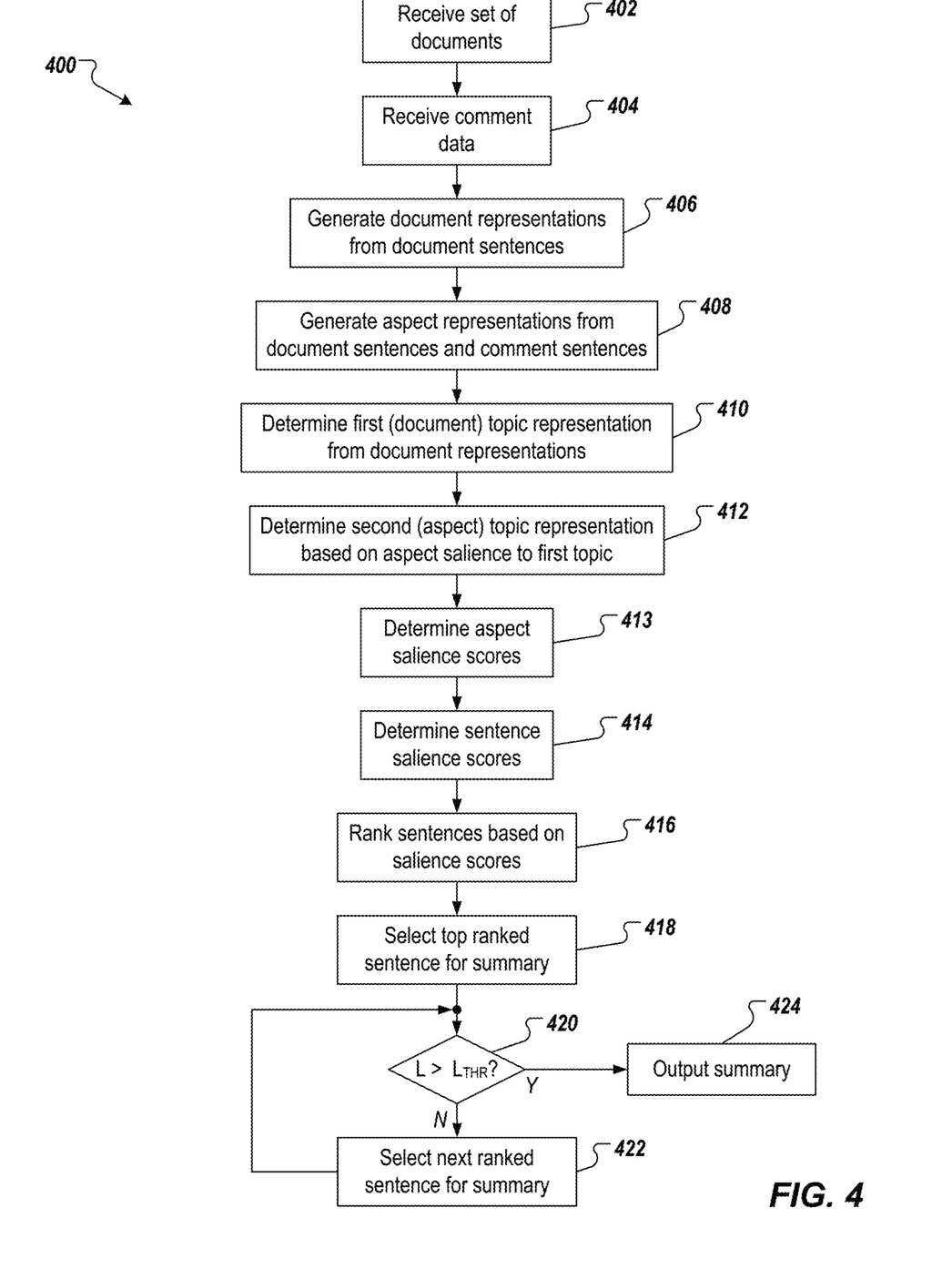
FIG. 4 depicts an example process that can be executed in accordance with implementations of the present disclosure.

FIG. 4 depicts an example process 400 that can be executed in accordance with implementations of the present disclosure. In some examples, the example process 300 is provided using one or more computer-executable programs executed by one or more computing devices (e.g., the server system 104 of FIG. 1).

A set of documents is received (402). For example, a set of electronic documents is received from a source (e.g., a database). Example documents can include, without limitation, web pages (e.g., HTML documents). In some examples, each document includes computer-readable text. For example, documents in the set of documents can include news articles published on one or more web pages. A set of comment documents is received (404). For example, a set of comment documents (e.g., electronic documents) is received from a source (e.g., a database). Example comment documents can include, without limitation, comments posted to web pages (e.g., HTML documents). In some examples, each comment document includes computer-readable text. For example, comment documents in the set of comment documents can include user comments to news articles of the set of documents published on one or more web pages.

Document representations are generated (406). In some examples, the document representations are determined based on document sentences. For example, and as described herein, sentence embeddings for the documents are provided using the RNN encoder, and the document sentence embeddings are sequentially fed into the next level bidirectional RNN encoder to generate the document representations. Aspect representations are generated (408). For example, and as described in detail herein, sentence representations generated from word embeddings are used to construct the aspect representations. In some examples, the aspect representations are determined based on document sentences, and comment sentences.

A first (document) topic representation is determined based on the document representations (410). For example, and as described herein, the first topic representation can include a document topic representation ($t_d$), which is determined using the document representations. In some examples, the bidirectional RNN is used to encode document embeddings to the first topic representation ($t_d$), which can be provided as the concatenation of hidden vectors on both directions at the last step of the RNN. A second (aspect) topic representation is determined based on aspect saliences to the first topic (412). For example, and as described herein, the second topic representation can include an aspect topic representation ($t_a$), which is determined using aspect saliences with respect to the first topic representation. In some examples, the aspect saliences are calculated using an attention mechanism on each aspect representation with respect to the first topic representation, and weighted aspect embeddings are fed into a bidirectional RNN, where the aspect topic representation is provided as the concatenation of hidden vectors on both directions at the last step of the RNN. In some examples, it is assumed that the document topic representation, and the aspect topic representation represent the same latent topic of the documents.

Aspect salience scores are determined (413). Sentence salience scores are determined (414). For example, and as described in further detail herein, initial saliences of sentences are calculated by applying an attention mechanism on each sentence representation with respect to aspect representations. That is, a set of initial salience scores is determined for each sentence representation, each initial salience score representing a salience of the sentence representation to a respective aspect representation. In some examples, the max initial salience score for each sentence over aspects is multiplied by the corresponding aspect salience score to provide a (global) salience score for each sentence representation (i.e., each sentence).

Sentences are ranked based on salience scores (416). For example, sentences are placed in rank order with the sentence having the highest value salience score ranked first, and the sentence having the lowest value salience score ranked last. A top ranked sentence is selected for a summary (418). That is, the highest ranked sentence is selected as the first sentence of the summary. It is determined whether a length (L) of the summary is greater than a threshold length ($L_{THR}$) (420). If the length is not greater than the threshold length, a next ranked sentence is selected for the summary (422), and the example process 400 loops back. If the length is greater than the threshold length, the summary is output (424).

Figure 5:
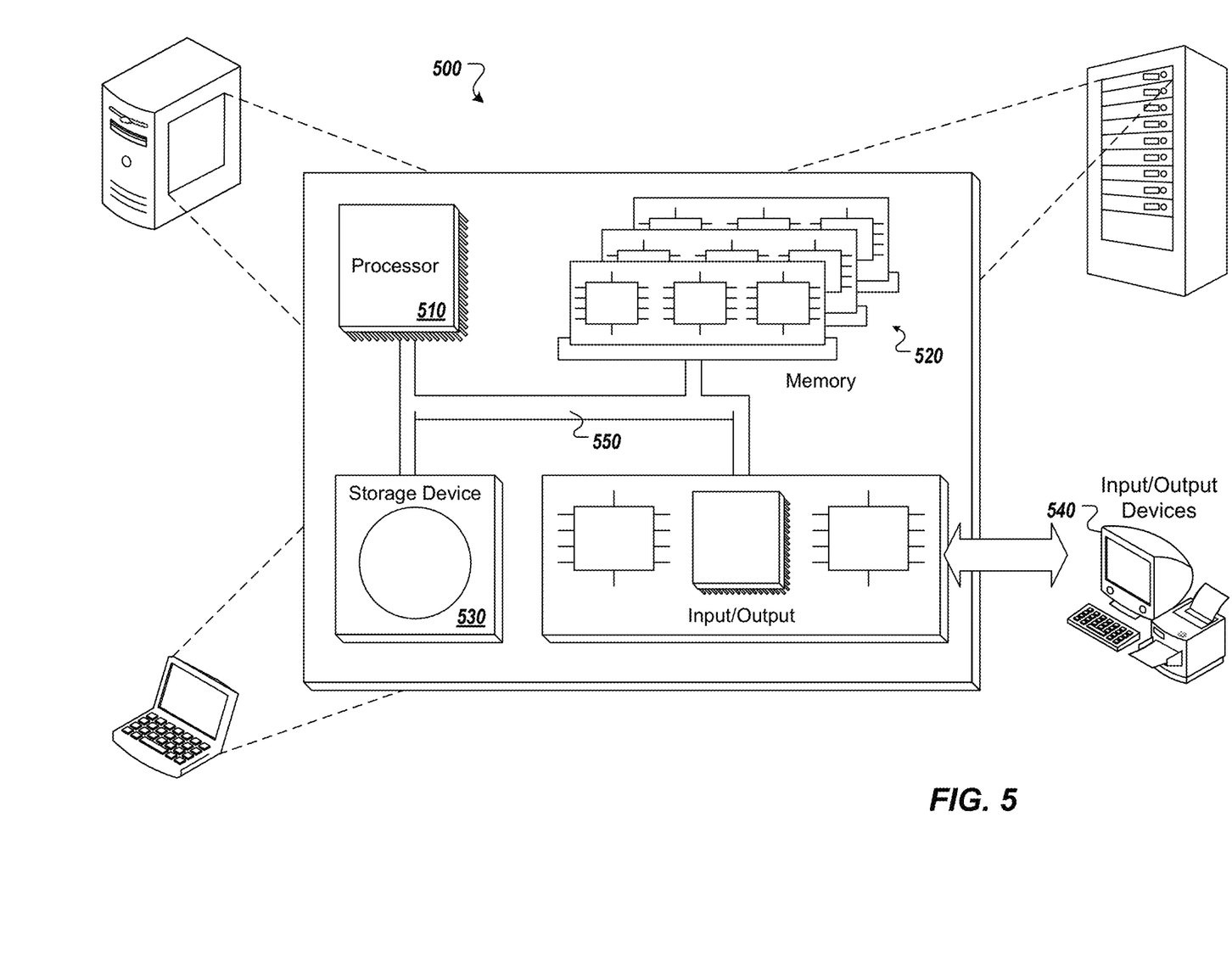
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 430 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for generating a summary of multiple documents, each document comprising an electronic document, the method being executed by one or more processors and comprising:
    generating document representations of documents in a set of documents based on sentence embeddings that are sequentially fed into a recurrent neural network (RNN) encoder, the set of documents comprising two or more documents and each document comprising an electronic document;
    generating aspect representations based on sentences included in documents of the set of documents, comment documents in a set of comment documents, and a set number of latent aspects assumed to be in the set of documents and the set of comment documents, the set of comment documents comprising two or more comment documents and each comment document comprising at least one sentence representative of a comment to a respective document in the set of documents;
    determining a document topic representation based on the document representations;
    determining an aspect topic representation based on aspect saliences with respect to the document topic representation, wherein the aspect saliences are calculated based on each aspect representation with respect to the document topic representation;
    calculating salience scores, each salience score associated with a respective sentence in the document representation, and calculated based on a set of initial salience scores, and a respective aspect salience score; and
    generating a summary of the set of documents based on the salience scores and a respective sentence of each salience score, the summary comprising a first sentence from a first document of the set of documents and a second sentence from a second document.

2. The method of claim 1, wherein generating document representations of documents comprises sequentially feeding sentence embedding into a next level bidirectional RNN encoder.

3. The method of claim 1, wherein determining the document topic representation comprises using a bidirectional RNN to encode document embeddings to the first topic representation.

4. The method of claim 3, wherein the document topic representation is a concatenation of hidden vectors on both directions at the last step of the bidirectional RNN.

5. The method of claim 1, wherein the aspect saliences are calculated using an attention mechanism on each aspect representation with respect to the document topic representation.

6. The method of claim 5, wherein weighted aspect embeddings are fed into the bidirectional RNN, and the aspect topic representation is provided as a concatenation of hidden vectors on both directions at the last step of the RNN.

7. The method of claim 1, wherein each salience score is determined for a respective sentence and aspect by identifying a maximum salience score in the set of initial salience scores, and multiplying the maximum salience score by an aspect salience of the respective aspect.

8. A non-transitory computer-readable storage medium coupled to one or more processors and having instructions stored thereon which, when executed by the one or more processors, cause the one or more processors to perform operations for generating a summary of multiple documents, each document comprising an electronic document, the operations comprising:
    generating document representations of documents in a set of documents based on sentence embeddings that are sequentially fed into a recurrent neural network (RNN) encoder, the set of documents comprising two or more documents and each document comprising an electronic document;

generating aspect representations based on sentences included in documents of the set of documents, comment documents in a set of comment documents, and a set number of latent aspects assumed to be in the set of documents and the set of comment documents, the set of comment documents comprising two or more comment documents and each comment document comprising at least one sentence representative of a comment to a respective document in the set of documents;

determining a document topic representation based on the document representations;

determining an aspect topic representation based on aspect saliences with respect to the document topic representation, wherein the aspect saliences are calculated based on each aspect representation with respect to the document topic representation;

calculating salience scores, each salience score associated with a respective sentence in the document representation, and calculated based on a set of initial salience scores, and a respective aspect salience score; and generating a summary of the set of documents based on the salience scores and a respective sentence of each salience score, the summary comprising a first sentence from a first document of the set of documents and a second sentence from a second document.

9. The computer-readable storage medium of claim 8, wherein generating document representations of documents comprises sequentially feeding sentence embedding into a next level bidirectional RNN encoder.

10. The computer-readable storage medium of claim 8, wherein determining the document topic representation comprises using a bidirectional RNN to encode document embeddings to the first topic representation.

11. The computer-readable storage medium of claim 10, wherein the document topic representation is a concatenation of hidden vectors on both directions at the last step of the bidirectional RNN.

12. The computer-readable storage medium of claim 8, wherein the aspect saliences are calculated using an attention mechanism on each aspect representation with respect to the document topic representation.

13. The computer-readable storage medium of claim 12, wherein weighted aspect embeddings are fed into the bidirectional RNN, and the aspect topic representation is provided as a concatenation of hidden vectors on both directions at the last step of the RNN.

14. The computer-readable storage medium of claim 8, wherein each salience score is determined for a respective sentence and aspect by identifying a maximum salience score in the set of initial salience scores, and multiplying the maximum salience score by an aspect salience of the respective aspect.

15. A system, comprising:
a computing device; and
a computer-readable storage device coupled to the computing device and having instructions stored thereon which, when executed by the computing device, cause the computing device to perform operations for generating a summary of multiple documents, each document comprising an electronic document, the operations comprising:

generating document representations of documents in a set of documents based on sentence embeddings that are sequentially fed into a recurrent neural network (RNN) encoder, the set of documents comprising two or more documents and each document comprising an electronic document;

generating aspect representations based on sentences included in documents of the set of documents, comment documents in a set of comment documents and a set number of latent aspects assumed to be in the set of documents and the set of comment documents, the set of comment documents comprising two or more comment documents and each comment document comprising at least one sentence representative of a comment to a respective document in the set of documents;

determining a document topic representation based on the document representations;

determining an aspect topic representation based on aspect saliences with respect to the document topic representation, wherein the aspect saliences are calculated based on each aspect representation with respect to the document topic representation;

calculating salience scores, each salience score associated with a respective sentence in the document representation, and calculated based on a set of initial salience scores, and a respective aspect salience score; and generating a summary of the set of documents based on the salience scores and a respective sentence of each salience score, the summary comprising a first sentence from a first document of the set of documents and a second sentence from a second document.

16. The system of claim 15, wherein generating document representations of documents comprises sequentially feeding sentence embedding into a next level bidirectional RNN encoder.

17. The system of claim 15, wherein determining the document topic representation comprises using a bidirectional RNN to encode document embeddings to the first topic representation.

18. The system of claim 17, wherein the document topic representation is a concatenation of hidden vectors on both directions at the last step of the bidirectional RNN.

19. The system of claim 15, wherein the aspect saliences are calculated using an attention mechanism on each aspect representation with respect to the document topic representation.

20. The system of claim 19, wherein weighted aspect embeddings are fed into the bidirectional RNN, and the aspect topic representation is provided as a concatenation of hidden vectors on both directions at the last step of the RNN.

* * * * *